F. E. CASE.
AUTOMATIC BATTERY CHARGING SYSTEM.
APPLICATION FILED DEC. 14, 1918.
1,347,323. Patented July 20, 1920.
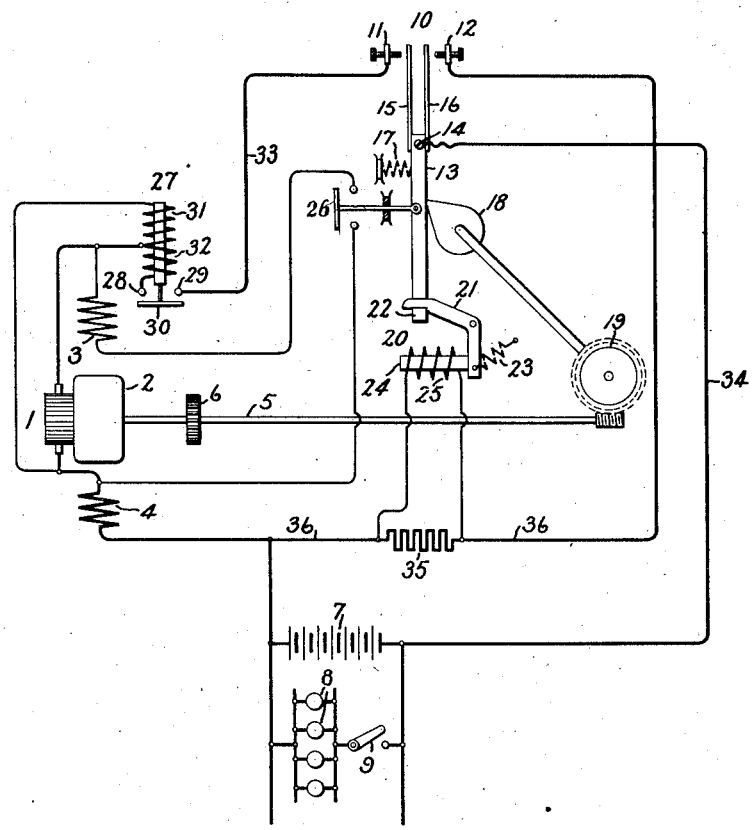
Inventor:
Frank E. Case,
by Albert G. Davis
His Attorney

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

AUTOMATIC BATTERY-CHARGING SYSTEM.

1,347,323.   Specification of Letters Patent.   Patented July 20, 1920.

Application filed December 14, 1918. Serial No. 266,795.

*To all whom it may concern:*

Be it known that I, FRANK E. CASE, a citizen of the United States, residing at Schenectady, in the county of Schenectady, State of New York, have invented certain new and useful Improvements in Automatic Battery-Charging Systems, of which the following is a specification.

My invention relates to battery charging systems, and the object of my invention is to provide a new and improved automatic battery charging system.

It is well known that the open circuit voltage across the terminals of a storage battery is not a certain indication of the amount of battery charge since, at "no load", the battery may have as high a terminal voltage when partly charged as when fully charged. From this it follows that battery charging systems which are automatically controlled in accordance with the battery voltage are uncertain in their operation. If, however, the battery be connected to a circuit capable of imposing a substantial load thereon, the value of the current in said circuit will indicate the true condition of the battery charge since, when the battery carries a substantial load, the voltage thereof is indicative of the condition of charge. In accordance with my invention, therefore, I have devised a system comprising a source of direct current, a storage battery, a testing circuit adapted to be connected across the battery and means responsive to the current in said circuit for controlling the connection and disconnection of said source and battery.

My invention may best be understood by reference to the accompanying drawing when considered in connection with the following specification, while the scope of my invention is defined in the appended claims.

Referring to the drawing, consisting of a single figure in which is diagrammatically shown an automatic battery charging system embodying one modification of my invention, 1 denotes a direct current generator comprising an armature 2, a shunt field winding 3 and a differential series winding 4. The armature 2 is mounted on a shaft 5 which may be rotated by any suitable driving means through the gear 6. When the system is employed on an automobile, a use to which it is particularly applicable, the speed of the shaft 5 and hence of the armature 2 will, of course, be variable. 7 denotes a storage battery and 8 denotes a lighting or other load which may be connected across the battery by means of the switch 9. 10 denotes switching means comprising stationary contacts 11 and 12, a switch lever 13 pivoted at 14 and provided with spring contact blades 15 and 16, which are adapted to coöperate with stationary contacts 11 and 12 respectively, a spring 17 for urging the lever 13 in a counter-clockwise direction, and a cam 18, connected by means of the worm gearing 19 to the shaft 5, for moving the lever 13 in a clockwise direction. The movement of the lever 13 from its mid-position in a counter-clockwise direction is controlled by the locking means 20 comprising a latch 21 arranged to engage with a projection 22 carried at the lower end of the lever 13. The latch 21 is under the joint control of a spring 23, tending to rotate it in a counter-clockwise direction, and an electromagnet 24, which is provided with an operating winding 25 and tends, when energized, to rotate the latch 23 in a clockwise direction. 26 denotes a switch, connected to and operated by the lever 13, for controlling the continuity of the shunt field winding circuit. 27 denotes a reverse current relay having contacts 28 and 29, a switch blade 30 for bridging said contacts, a winding 31, connected across the brushes of the generator 1, and a winding 32, connected between the upper brush of the generator 1 and the contact 28. The contact 29 is connected by means of the conductor 33 to the stationary contact 11 of the switching means 10. The lower brush of the generator 1 is connected through the differential series field winding to the left hand terminal of the battery 7. The lever 13 is electrically connected to the right hand terminal of the battery 7 by means of the conductor 34. 35 denotes a resistance located in a conductor 36 connected between the left hand terminal of the battery 7 and the stationary contact 12 of the switching means 10. Across a portion, or all, of the resistance 35 is connected the operating winding 25 of the electromagnet 24.

In considering the operation of the system, let it be assumed that the shaft 5 is in rotation. The cam 18 will, therefore, also be rotating at a speed dependent upon the speed of rotation of the shaft 5 by which it is driven. Once during each revolution of the cam 18 the lever 13 is moved in a clockwise direction until the contact blade 16 engages with the stationary contact 12, whereupon a testing circuit, extending from the right-hand terminal of the battery 7 through the conductor 34, the lever 13, the contact blade 16, the stationary contact 12, the conductor 36 and the resistance 35 to the left hand terminal of the battery 7, is completed. When the lever 13 is in its extreme clockwise position, at which time the contact blade 16 engages the stationary contact 12, the projection 22 at the lower end of the lever 13 will clear the end of the latch 21, which will rotate in a counter-clockwise direction out of the path of the projection 22, providing the electromagnet 24 is insufficiently energized to overcome the tension of the spring 23 and maintain the latch 21 in the position illustrated. If, at this time, the battery is sufficiently charged, the electromagnet 24 will be energized sufficiently to maintain the latch 21 in the position illustrated so that the lever 13, upon the subsequent rotation of the cam 18, will be prevented from moving in a counter-clockwise direction beyond the mid-position in which it is illustrated. So long as the battery remains charged the testing circuit will be completed at intervals but the lever 13 will be prevented from effecting engagement between the contact blade 15 and the stationary contact 11. If, however, the battery is insufficiently charged, the electromagnet 24 will be incapable of overcoming the tension of the spring 23 so that when the lever 13 is moved to its extreme clockwise position the latch 21 will be rotated by the spring 23 in a counter-clockwise direction out of the path of the projection 22. Upon the continued rotation of the cam 18, the spring 17 will cause the lever 13 to follow first closing the switch 26 and subsequently causing the contact blade 15 to engage with the stationary contact 11. Upon the closing of the switch 26 the shunt field circuit of the generator 1 is completed, and, providing the speed of the armature 2 is sufficiently high, the voltage of the generator will quickly build up. At a certain voltage the operating winding 31 of the reverse current relay 27 will cause the switch blade 30 thereof to bridge the contacts 28 and 29. There will then be completed a charging circuit extending from the upper brush of the generator 1 through the winding 32 of the reverse current relay 27, the stationary contact 28, the switch blade 30, the stationary contact 29, the conductor 33, the stationary contact 11, the contact blade 15, the lever 13, the conductor 34, the battery 7, and the differential series field winding 4 to the lower brush of the generator 1. Providing the voltage developed by the generator 1 continues in excess of the voltage of the battery 7 this charging circuit will remain unbroken while the switch blade 15 remains in engagement with the stationary contact 11. By continued rotation of the cam 18, however, the contact blade 15 is moved out of engagement with the contact 11 and the switch 26 is opened, thereby opening the circuit through the shunt field winding of the generator, and later the testing circuit is again completed. If the battery is fully charged the latch 21 will be raised into the position illustrated through the operation of the electromagnet 24 as soon as the lever 13 reaches its extreme clockwise position and the contact blade 15 will remain disengaged from the stationary contact 11 during at least one revolution of the cam 11. If, however, the battery is not sufficiently charged the latch 21 will remain out of the path of the projection 22 and charging of the battery will be brought about during a portion of the revolution of the cam 18 in the manner already described. If, during the charging period, the voltage of the generator should fall below that of the battery a reversal of the direction of flow of current through the winding 32 of the reverse current relay 27 will take place and the reverse current relay will open thereby opening the charging circuit. Since the generator is provided with a differential field winding, in order to regulate the voltage thereof, the shunt field switch 26, which is opened soon after disengagement of the contact blade 15 of the stationary contact 11, is provided primarily to prevent excessive generator voltage during the non-charging periods. The opening of the field circuit of the generator also decreases the generator losses during the time when it is not connected to the battery.

What I claim as new and desire to secure by Letters Patent of the United States, is:

1. In combination, a source of current supply, a storage battery, a testing circuit, automatic means adapted to effect the opening and closing of contacts in a circuit through said source and battery and to effect the opening and closing of contacts in a circuit through said battery and testing circuit, and means controlled by the current in said testing circuit for varying the movement of said automatic means to effect the closing of the contacts in the circuit through said batttery and source.

2. In combination, a source of current supply, a storage battery, a testing circuit, automatic means adapted to effect the opening and closing of contacts in a circuit through said source and battery and to effect the opening and closing of contacts in a circuit through said battery and testing circuit, and means controlled by the current in said testing circuit for varying the movement of said automatic means to permit or prevent said automatic means to effect the closing of the contacts in the circuit through said battery and source.

3. In combination a source of current supply, a storage battery, a testing circuit, automatic means for making and breaking a circuit through said source and said battery and for making and breaking a circuit through said battery and testing circuit, and means responsive to the current in said testing circuit for controlling the operation of said automatic means with respect to the connection and disconnection of said source and battery without affecting the operation of said automatic means with respect to the connection and disconnection of said battery and said testing circuit.

4. In combination, a source of current supply, a storage battery, a testing circuit, switching means adapted to effect the opening and closing of contacts in a circuit through said source and battery and to effect the opening and closing of contacts in a circuit through said battery and testing circuit, continuous operating means for operating said switching means, and means responsive to current in said testing circuit for varying the movement of said switching means to effect the closing of the contacts in a circuit through said source and battery.

5. In combination a variable speed generator, driving means therefor, a storage battery, a testing circuit, switching means for connecting said source and battery and connecting said battery and testing circuit, means rotated by said driving means for actuating said switching means, and means responsive to the current in said testing circuit for controlling the actuation of said switching means to connect said source and battery.

6. In combination a variable generator, driving means therefor, a storage battery, a testing circuit, switching means for alternately making and breaking the circuit through the battery and said testing circuit, and for making and breaking a circuit through said generator and battery, means comprising a member rotated by said driving means for actuating said switching means and locking means operable when means in said testing circuit exceeds a predetermined value for preventing the operation of said switching means to connect said source and battery.

7. In combination a variable speed generator having shunt and differential field windings, driving means therefor, a storage battery, a testing circuit, switching means for alternately making and breaking a circuit through said battery and testing circuit and for making and breaking through said generator and battery, means comprising a member rotated by said driving means for actuating said switching means, and locking means operable in response to the current in said testing circuit for controlling the operation of said switching means to connect said source and battery and a switch for maintaining a circuit in said shunt field winding open except when the generator and battery are connected.

8. In combination a variable speed generator, driving means therefor, a storage battery, a testing circuit, switching means for alternately making and breaking the circuit through the battery and said testing circuit, and for making and breaking a circuit through said generator and battery, means comprising a member rotated by said driving means for actuating said switching means, and locking means operable when means in said testing circuit exceeds a predetermined value for preventing the operation of said switching means to connect said source and battery, and a reverse current relay interposed between said generator and battery.

In witness whereof I have hereunto set my hand this 13th day of December, 1918.

FRANK E. CASE.